(12) United States Patent
Nassar et al.

(10) Patent No.: US 10,013,816 B2
(45) Date of Patent: Jul. 3, 2018

(54) VEHICLE DIAGNOSTIC SYSTEM AND METHOD

(71) Applicant: Drew Technologies, Inc., Ann Arbor, MI (US)

(72) Inventors: Ghassan Nassar, Canton, MI (US); Brian Herron, Dexter, MI (US); Michael Drew, Dexter, MI (US)

(73) Assignee: DREW TECHNOLOGIES, INC., Ann Arbor, MI (US)

( * ) Notice: Subject to any disclaimer, the term of this patent is extended or adjusted under 35 U.S.C. 154(b) by 100 days.

(21) Appl. No.: 15/079,962

(22) Filed: Mar. 24, 2016

(65) Prior Publication Data

US 2016/0300402 A1   Oct. 13, 2016

Related U.S. Application Data

(60) Provisional application No. 62/139,273, filed on Mar. 27, 2015.

(51) Int. Cl.
*G07C 5/08* (2006.01)
*G07C 5/00* (2006.01)
*G06F 17/00* (2006.01)

(52) U.S. Cl.
CPC ............. *G07C 5/008* (2013.01); *G07C 5/085* (2013.01); *G07C 5/0808* (2013.01); *G06F 17/00* (2013.01)

(58) Field of Classification Search
CPC . H04W 4/00; H04M 1/00; H04Q 7/38; H04Q 7/20

USPC ......... 701/29.1, 29.3, 29.5, 29.6, 31.4, 32.8, 701/34.4, 36; 709/246, 249; 455/411, 455/418, 432.1, 408
See application file for complete search history.

(56) References Cited

U.S. PATENT DOCUMENTS

| | | | | |
|---|---|---|---|---|
| 7,957,744 B2* | 6/2011 | Oesterling | ............. | G07C 5/008 455/412.1 |
| 8,063,797 B1* | 11/2011 | Sonnabend | ........ | G06K 9/00791 340/932.2 |
| 8,848,608 B1* | 9/2014 | Addepalli | ............. | H04W 4/046 370/328 |
| 9,235,971 B1* | 1/2016 | Juels | ...................... | G08B 21/00 |
| 9,426,223 B2* | 8/2016 | Wang | ................ | H04L 67/125 |
| 9,457,740 B2* | 10/2016 | Odate | ................... | H04L 67/125 |
| 9,478,076 B2* | 10/2016 | Mitchell | ............... | B60R 16/023 |
| 2011/0149982 A1* | 6/2011 | Hwang | ............... | H04L 12/4625 370/401 |
| 2012/0109446 A1* | 5/2012 | Yousefi | .................. | H04N 7/183 701/29.3 |

(Continued)

*Primary Examiner* — Thomas G Black
*Assistant Examiner* — Wae L Louie
(74) *Attorney, Agent, or Firm* — Brinks Gilson & Lione

(57) ABSTRACT

A system for diagnosing and repairing vehicles includes a diagnostic vehicle system having at least one electronic controller for configured to execute algorithms that generate data related to the diagnostic operations of the vehicle. Also includes is an interface in communication with the at least one electronic controller of the diagnostic vehicle system and at least one electronic controller of the vehicle. The electronic controller is configured to provide access via an application programming interface to a user via the interface to data generated by the algorithms and restrict access to the algorithms that generate the data related to the diagnostic operations of the vehicle.

19 Claims, 6 Drawing Sheets

(56) References Cited

U.S. PATENT DOCUMENTS

| | | | |
|---|---|---|---|
| 2013/0159466 A1* | 6/2013 | Mao | H04L 67/12 |
| | | | 709/218 |
| 2015/0371457 A1* | 12/2015 | Bakfan | G07C 5/008 |
| | | | 701/29.3 |
| 2016/0075175 A1* | 3/2016 | Biderman | A61B 5/222 |
| | | | 301/6.5 |
| 2016/0300402 A1* | 10/2016 | Nassar | G07C 5/0808 |
| 2016/0335812 A1* | 11/2016 | Drew | G07C 5/008 |
| 2017/0024942 A1* | 1/2017 | Drew | G07C 5/0808 |

* cited by examiner

VEHICLE DIAGNOSTIC SYSTEM AND METHOD

RELATED APPLICATION

The present patent document claims the benefit of the filing date under 35 U.S.C. § 119(e) of Provisional U.S. Patent Application Ser. No. 62/139,273, filed Mar. 27, 2015, which is hereby incorporated by reference in its entirety.

BACKGROUND

1. Technical Field

The present invention generally relates to vehicle diagnostic tools.

2. Background Information

In the past, diagnostic tools used in car dealerships were bespoke, handheld tools with self-contained software and proprietary hardware. These tools were first offered in the late 1980's when vehicles began to incorporate fuel injection and onboard computer systems. They would allow the technician to read data from the onboard computer systems on their self-contained screen and use a keypad to perform diagnostic tests on the engine computer.

Starting around the year 2000, these diagnostic systems began shifting from bespoke handheld systems to PC-based applications that would connect to the vehicle using a pass-thru interface. This shift was necessary because the complexity of the user interface and amount of vehicle diagnostic data was exceeding the limitations of the bespoke handheld systems.

As these PC systems grow to support more advanced vehicles, they are becoming increasingly complex and difficult for car companies to manage and develop. The typical diagnostic system is comprised of an end user application with proprietary information incorporated inside, database of vehicle-specific diagnostic information, authoring tools to add support for new vehicles, and database that records diagnostic transactions for every vehicle. In some cases the end user application and database with diagnostic information are compiled into a single executable and in other cases the database with diagnostic information is located on a server on the internet.

A single vendor is typically hired to develop the entire diagnostic system because no one has ever developed a way separate out the components of the system into pieces. The single-vendor nature of the business has created several issues for car companies and end users. The diagnostic system is limited to the resources and technical capabilities of that vendor. If the car company wants a feature, it must pay whatever price that vendor demands because the car company cannot ask another vendor to create features inside the closed system. If the car company is not happy with the relationship and wishes to terminate with that vendor, they have to discard the entire diagnostic system and start fresh with a new vendor in a process that typically takes more than a year.

While the original diagnostic system is used at car dealerships and in some aftermarket shops, there is also a large market for third party diagnostic systems. These systems, made by companies such as Snap-on, Launch, and Bosch, offer technicians the capability to diagnose vehicles from several car companies instead of the dealer system that can only diagnose one make. Many technicians use these third party systems because they are simple to use and share the same user interface across multiple brands of vehicles. The information in these third party systems is often licensed from the car company or reverse engineering if otherwise not available.

When a third party company licenses diagnostic information from a car company, the information is typically provided to the third party company as a set of files or databases that represent all of the diagnostic information at that one moment in time. The third party companies then have to aggregate all of the diagnostic information from several different car companies into a single system, test that application, and release it to the aftermarket.

The problem with third party diagnostic systems is that they do not always have complete and correct diagnostic information for vehicles. This is because the third party systems license the data from car companies but often get out of date or incorrect information. There is no way for third party companies to access the authored data already in the diagnostic system in real time so they must purchase a database or series of files that contain the diagnostic information for each year/make/model of car and then input that into the third party system. There can be transcription errors, and often times the car company will update their own diagnostic information but those updates do not make it into the third party system. It can also take many months for third party systems to get access to this information, author it into their own system, test it, and release it. Some problems with the current system that solved by the present invention include:

1. The current model forces the car company to use a single vendor for all aspects of their diagnostic system. If the vendor is not expert in all areas, the car company may be forced to compromise on features, cost, or performance.

2. If the car company is unhappy with the vendor's performance and wants to switch or develop things in-house, they often have to throw away the entire system and create a new system.

3. If the car company wants to expand their system to different platforms (such as mobile phones or tablets), they must pay their existing vendor to expand the system and new versions. Sometimes vendors may be unwilling or unable to expand their system to new platforms.

4. The way car companies license their diagnostic information to third parties is inefficient, expensive to maintain, and prone to introducing errors into third party applications.

5. In the current model, car companies are forced to license their diagnostic data that contains secret algorithms and other intellectual property to scantool companies with no built-in protection for that IP.

BRIEF SUMMARY

A system for diagnosing and repairing vehicles includes a diagnostic vehicle system having at least one electronic controller for configured to execute algorithms that generate data related to the diagnostic operations of the vehicle. Also includes is an interface in communication with the at least one electronic controller of the diagnostic vehicle system and at least one electronic controller of the vehicle. The electronic controller is configured to provide access via an application programming interface to a user via the interface to data generated by the algorithms and restrict access to the algorithms that generate the data related to the diagnostic operations of the vehicle.

The system may further include a client device operated by the user. The client device is configured to selectively communicate with the interface, wherein the client device receives the data related to the diagnostic operations of the vehicle.

The system may also include a user application operating on the client device, wherein the user application is provided access via the application programming interface to data generated by the algorithms and restricted from access to the algorithms that generate the data related to the diagnostic operations of the vehicle.

Further objects, features and advantages of this invention will become readily apparent to persons skilled in the art after a review of the following description, with reference to the drawings and claims that are appended to and form a part of this specification.

DETAILED DESCRIPTION

For over 10 years, there has been a standard for the vehicle interface used in diagnostic systems called Society of Automotive Engineering ("SAE") J2534. This standard defines a way to communicate with the pass-thru vehicle interface so diagnostic systems can interoperate with different vehicle hardware interfaces. This standard has proven to be hugely successful and has created competition among several vendors to offer different vehicle interfaces at different price points with different features. There has been widespread success by removing the vehicle interface from the closed diagnostic system.

Figure 1:
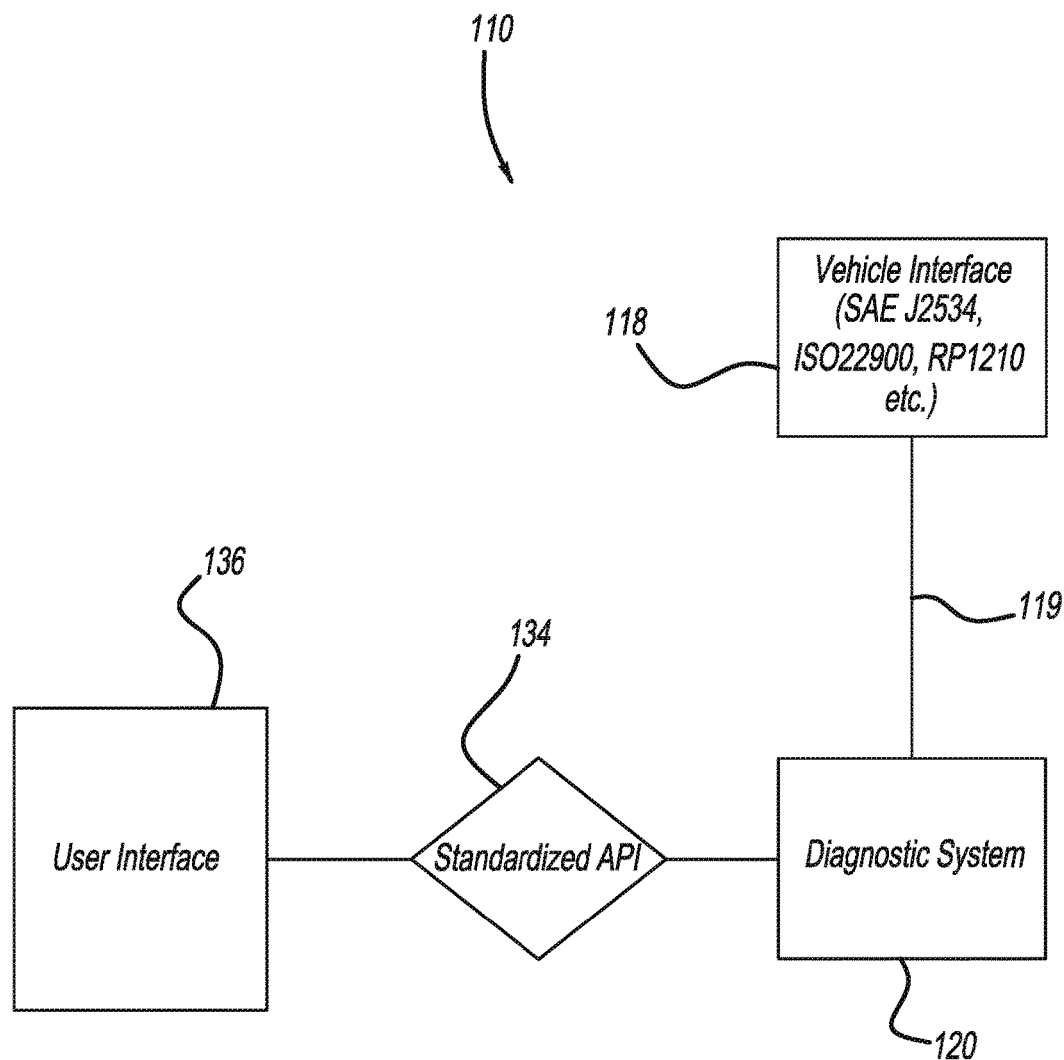
FIG. 1 illustrates a flow diagram of a system for diagnosing and repairing vehicles.
Figure 4:
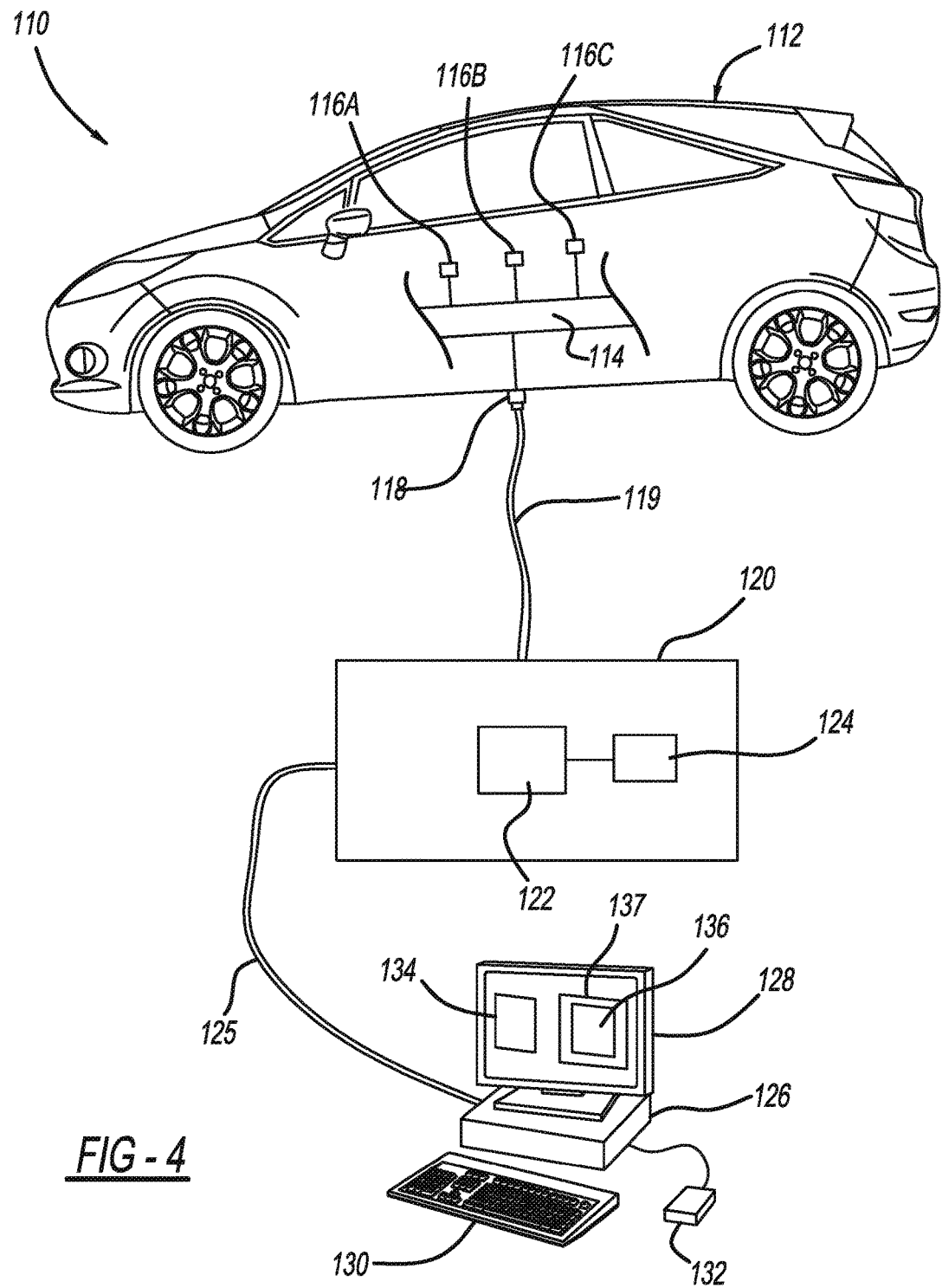
FIG. 4 illustrates the system for diagnosing and repairing vehicles of FIG. 1.

Referring to FIGS. 1 and 4, a system 110 for diagnosing and repairing a vehicle 112 is shown. FIG. 1 illustrates a flow diagram, while FIG. 4 illustrates the related system. The vehicle 112 may be any type of vehicle, such as an automobile, truck, commercial vehicle, mining vehicle, aircraft, watercraft, or the like. It should be understood that the vehicle 112 may take any one of a number of different forms. However, the vehicle 112 should be understood to be any type of vehicle capable of transporting goods or persons from one point to another.

Generally, the vehicle 112 includes a system bus 114 that allows different electronic subsystems 116A, 116B, and 116C to communicate between each other. Any type of system bus 114 may be utilized, but the system bus 114 may be a controller area network bus, commonly utilized in the automotive industry. The electronic subsystems 116A, 116B, and 116C may be any one of a number of different electronic subsystems commonly found on vehicles. For example, the electronic subsystems 116A, 116B, and 116C may be of vehicle diagnostic system, antilock braking system, safety electronic system, emissions related system, and the like. These examples given are simply examples in any one of a number of different types of electronic subsystems may be connected to the bus 114.

The bus 114 and electronic subsystems 116A, 116B, and 116C are able to communicate with external devices via an interface 118. The interface 118 may be any one of a number of different interfaces, such as SAE J2534, ISO 22900, RP1210, etc. Additionally, as will be explained later, the interface 118 may be IEEE 802.11x, USB, Bluetooth, Ethernet, or any point to point connection. The purpose of the interface 118 is to allow access to the bus 114 and the electronic subsystems 116A, 116B, and 116C by an external device, such as a diagnostic tester. The term IEEE 802.11x is used in this specification as generic term to refer to the IEEE 802.11 standard for defining communication over a wireless LAN (WLAN). 802.11, commonly known as Wi-Fi.

A diagnostic vehicle system 120 may be connected to the interface 118 by a cable 119. Of course, it should be understood that instead of utilizing a cable 119, I wireless transmission protocol such as IEEE 802.11x, Bluetooth and the like could be utilized. The diagnostic vehicle system 120 generally includes an electronic controller 122, such as a microprocessor, for performing any one of a number of different methods and functions described in this specification. In addition, the diagnostic vehicle system 120 may also include a memory 124 that is in communication with the electronic controller 122. The memory 124 may contain executable code to execute any one of a number of different methods and functions described in this specification. The memory 124 may take any one of a number of different forms, such as magnetic memory, solid-state memory, optical memory, holographic memory, and the like. It should also be understood that the memory 124 may be integrated within the controller 122. Further, it should be understood that the controller 122 may be a single controller or may be separate controllers working in concert.

A client 126 may be connected to the vehicle diagnostic system 125 via cable 125. Of course, like cable 119, the cable 125 may be replaced with a wireless transmission protocol, such as IEEE 802.11x, Bluetooth and the like. The client 126 may include an output device 128, such as a monitor or printer. Further, the client 126 may include input devices 130 and 132, such as a keyboard and mouse, as respectively shown.

The client 126 may be a general-purpose personal computer, but could also be a dedicated device. Further, the client 126 may be a smart phone or a tablet device, utilizing Android, Apple iOS, Windows or any other operating system. If the client 126 is a general-purpose computer, any one of a number of different operating systems may be utilized by the general-purpose computer, such as Mac OS X, Microsoft Windows, Linux, UNIX, and the like.

A standardized application programming interface ("API") allows a user of the client 126 to access data generated by the vehicle diagnostic device 120 via a user interface 136 of an application 137 that operates on the client 126. The electronic controller 122 is configured to provide access to the client 126 via the application programming interface 134 to a user via the interface 136 to data generated by the algorithms and restrict access to the algorithms that generate the data related to the diagnostic operations of the vehicle.

One feature of the invention is to remove the application user interface from the closed vehicle diagnostic system 120 while creating a standard way for any user interface to access the diagnostic application of the vehicle diagnostic system 120. This system abstracts out all of the intellectual property and proprietary algorithms from the user interface 136. All of the intellectual property and secrets are stored inside of a separate protected vehicle diagnostic system 120. The user interface 136 can be created specifically for use at car dealerships, or by third parties that license access to the data.

Another feature is to enable transmission of other service related information to the user interface 136 in a standard way. This secondary information includes reprogramming, technical service bulletins, labor estimates, recall information, vehicle service history, telematics data, VIN decoding, crash data, authorized logos and images, and more.

In addition to separating the user interface 136 and enhancing its capabilities, the invention also creates a standard way to communicate with the vehicle authoring and database reporting tools. These features are typically only used inside the car companies. Creating an internal standard will allow the car company to create new applications to author diagnostic data in more efficient ways and better access to view and evaluate the service information contained inside the system.

Architecting a system that is divided into several functional pieces that interoperate in a standard way will allow car companies to contract specific pieces out to vendors or even choose to develop some of those pieces in-house. By dividing the system into functional pieces, a car company can select different vendors for each piece thereby reducing risk. Additionally, a car company could have hire a replacement vendor and develop a replacement in a shorter timeframe and with less expense due to the reduced scope.

By using a standard interface between the application 137 and vehicle diagnostic system 120, it allows the car company to create several end user applications 137 that access the same vehicle diagnostic system 120. By allowing third party systems to directly access the vehicle diagnostic system 120, they can license access to the diagnostic data that is used by the main diagnostic system. In the new model, car companies would not give out the actual diagnostic algorithms. Instead, they would allow applications 137 to connect to the diagnostic engine that communicates directly with a vehicle. The secrets are kept inside the vehicle diagnostic system 120 and not revealed to the third party application 137. Only the results of the diagnostic tests.

The user interface 136 has ability to initiate module reprogramming and view reprogramming results is delivered to the user application 137 thru the vehicle diagnostic system 120. Service information such as repair procedures, technical service bulletins, recall information, labor estimates, and other technical information is delivered to the user application 137 thru the vehicle diagnostic system 120. VIN decoding information and specific vehicle configuration information such as tire size, engine displacement, transmission type, and customer ordered options, regional configuration, and other build information is delivered to the user application 137 thru vehicle diagnostic system 120. The vehicle service history may be delivered to the user application 137 thru the vehicle diagnostic system 120. The vehicle manufacturing information and warranty status is delivered to the user application 137 thru vehicle diagnostic system 120. Telematics data that is collected from the vehicle is delivered to the user application 137 thru the vehicle diagnostic system 120.

An onboard flight recorder and crash data that is collected from the vehicle is delivered to the user application 137 thru the vehicle diagnostic system 120. Parts diagrams and part numbers relevant to the vehicle being serviced are delivered to the user application 137 thru the vehicle diagnostic system 120. State and federal emissions tests can be performed thru the user application 137 thru the vehicle diagnostic system 120. Authorized images such as logos and trademarks are delivered to the user application 137 thru the vehicle diagnostic system 120.

Access to the vehicle diagnostic system 120 can be licensed to third party application developers to develop one or many different user applications. Different user applications can be developed using information accessed thru the vehicle diagnostic system 120 for vehicle diagnostics, vehicle reprogramming, vehicle manufacturing, Original Equipment ("OE") vehicle engineering, OE vehicle calibration, vehicle quality control applications, state and federal inspection-maintenance applications, service writer applications, vehicle check-in for service applications, battery charger applications, air conditioning machine applications, wheel alignment applications, crash repair applications, tire pressure monitor applications, oil change applications, fluid flush applications, transmission service applications, and other vehicle related uses. The application programming interface 134 may be configured to allow for the starting, stopping, and pausing of diagnostic tests performed by the algorithms. The application programming interface 134 may configured to allow for viewing live data, bi-directional controls, performing diagnostic tests, running health reports, configuring vehicle modules, and customizing vehicle module software.

Figure 2:
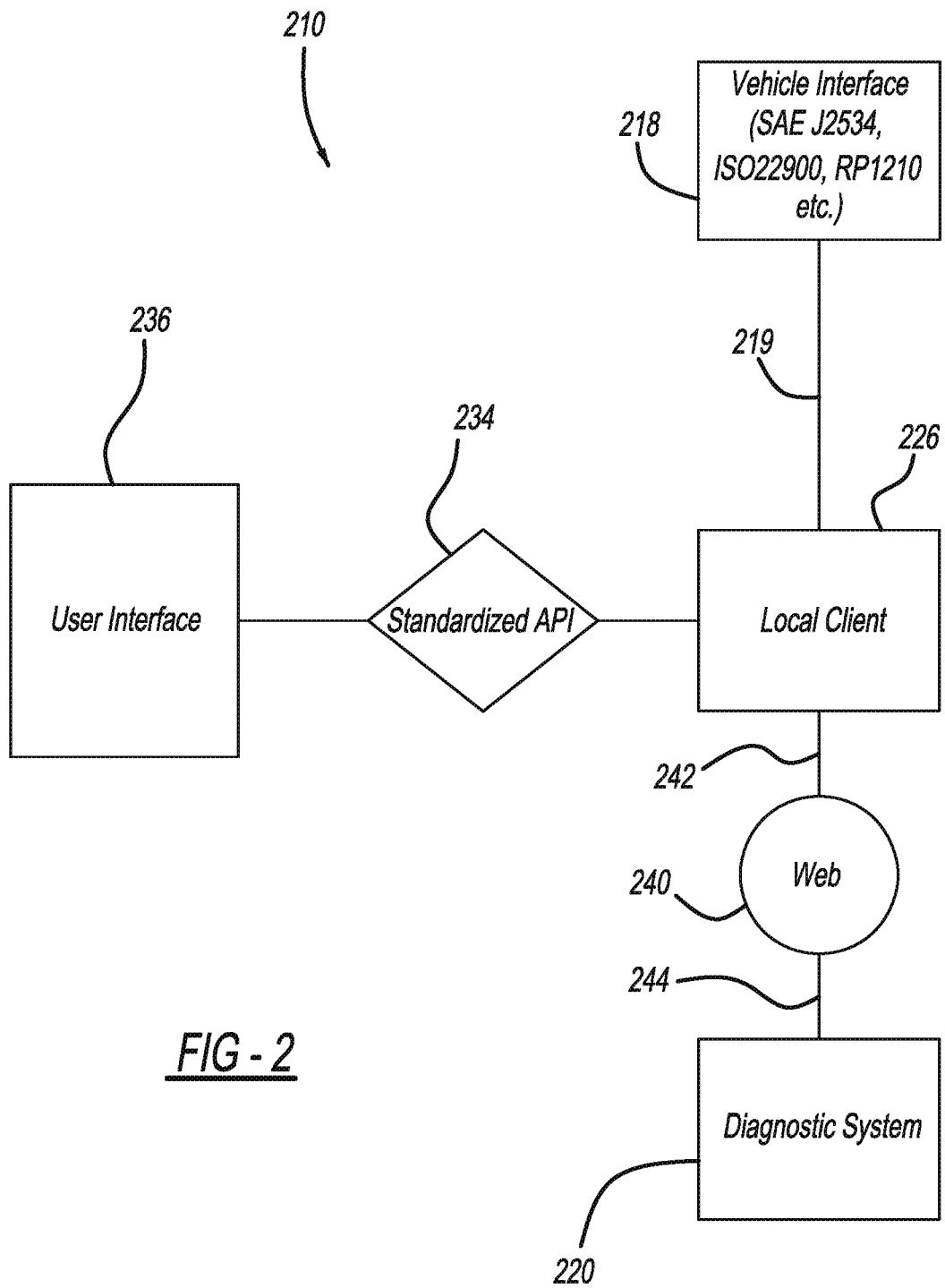
FIG. 2 illustrates another embodiment of a flow diagram of a system for diagnosing and repairing vehicles having a client device.
Figure 5:
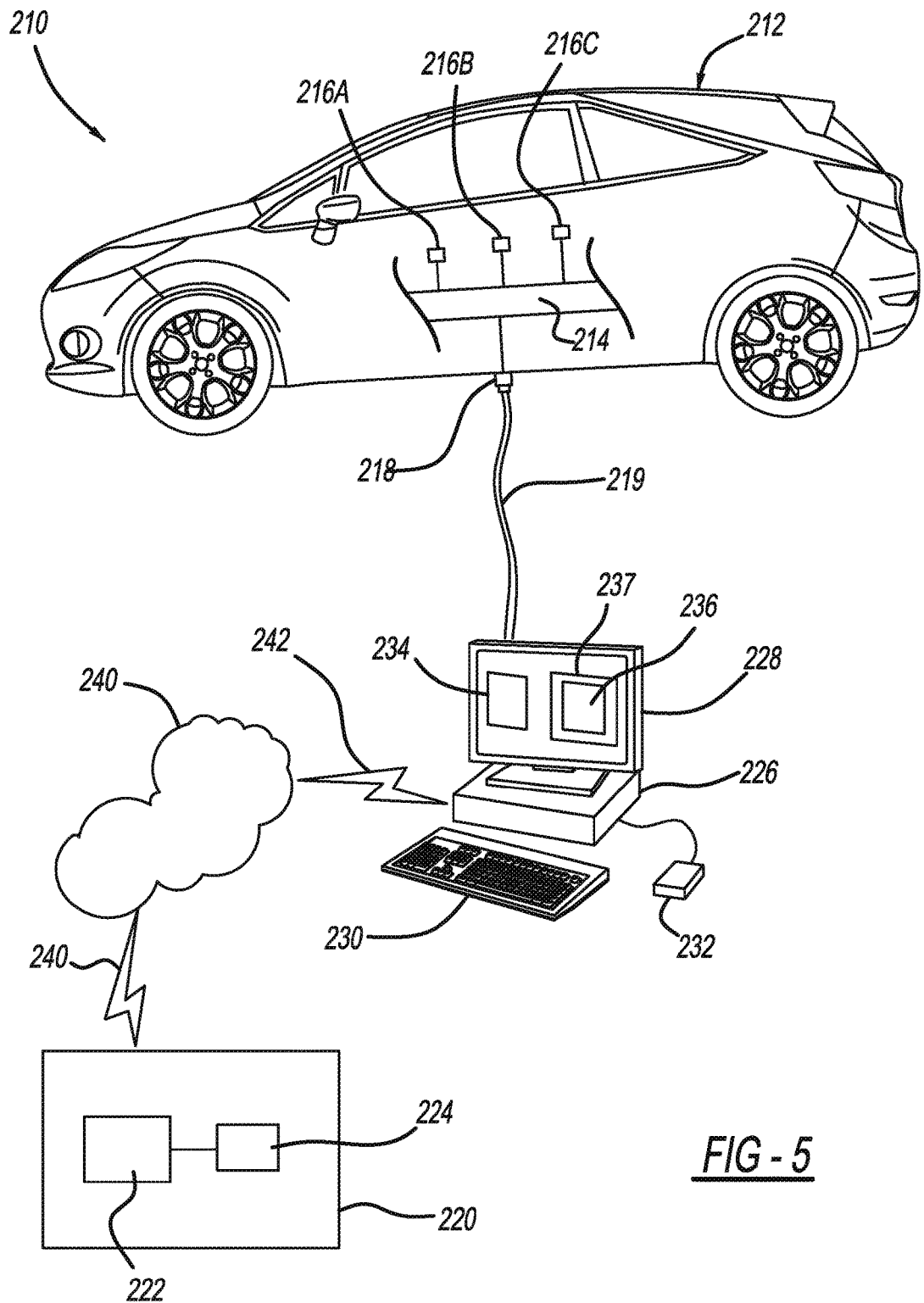
FIG. 5 illustrates the system for diagnosing and repairing vehicles of FIG. 2.

Referring to FIGS. 2 and 5, a flowchart and system of the system 210 is shown. FIG. 2 illustrates the flowchart, while FIG. 5 illustrates the system 210. Like reference numerals have been utilized to refer to like elements previously shown in FIGS. 1 and 4 and in the paragraphs above, with the difference that the reference numerals have increased by one hundred. As such, the description provided of these elements above is equally applicable to this embodiment and will not be repeated unless there is a difference.

The embodiment shown in FIGS. 2 and 5 differ in that the client 226 is directly connected to the interface 218 by the cable 219. The vehicle diagnostic device 220 is located in a completely remote location. The client 226 is configured to communicate with the vehicle diagnostic system 220 via a distributed network 240, such as the Internet. The client 226 maybe connected to the distributed network 240 via a connection 242. The connection 242 may be a physical connection or maybe a wireless connection, such as those described above. The vehicle diagnostic system 220 is connected to the distributed network 240 via connection 244. Like connection 242, the connection 244 may be a physical connection or may be a wireless connection, such as those described above.

In this embodiment, the diagnostic vehicle system is an internet-connected diagnostic system 220 in which the user interfaced 236 has access to data generated by the algorithms and restricted from access to the algorithms that generate the data related to the diagnostic operations of the vehicle 212.

Figure 3:
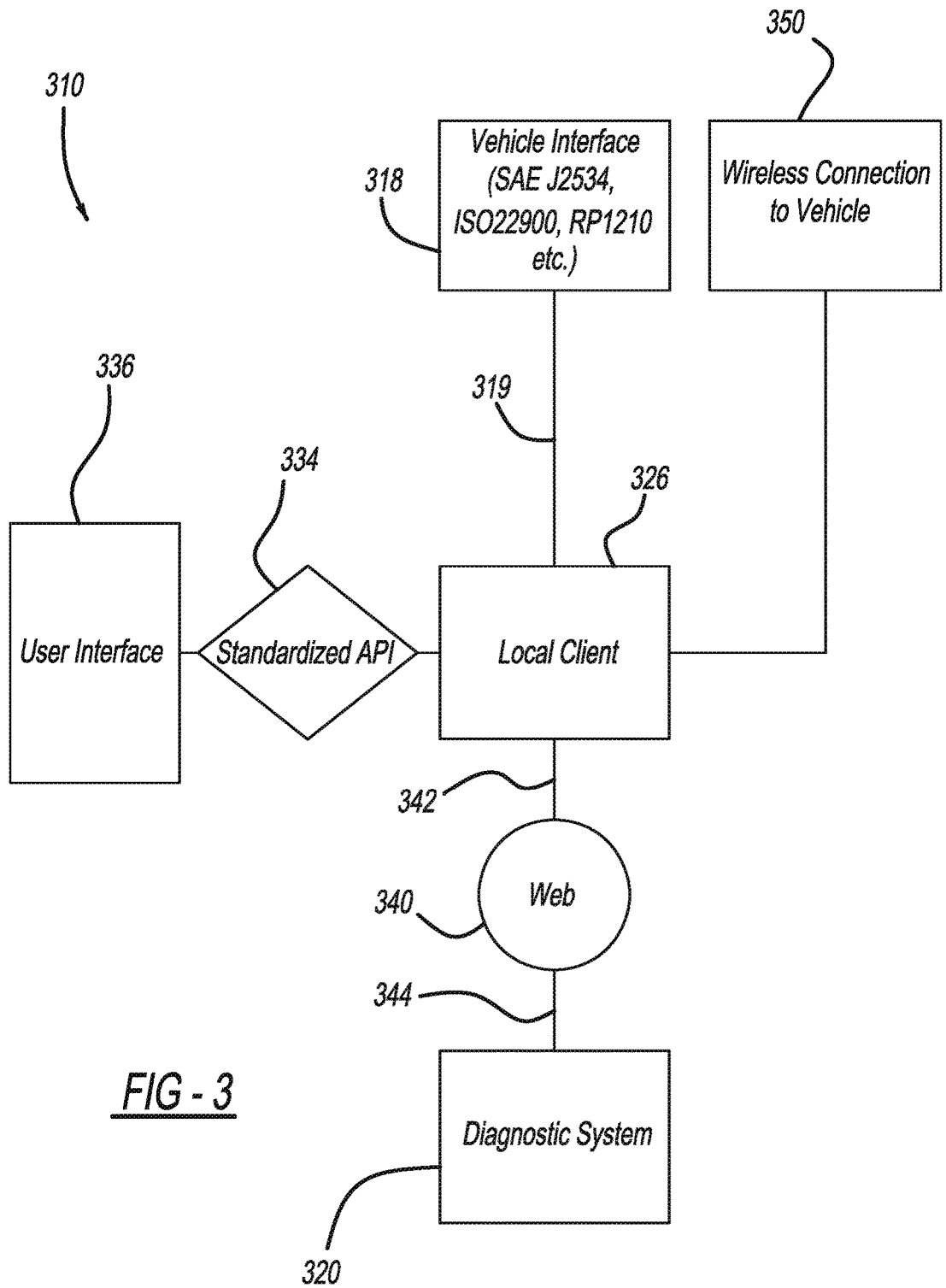
FIG. 3 illustrates another embodiment of a flow diagram of a system for diagnosing and repairing vehicles having a local client and an Internet accessible diagnostic system.
Figure 6:
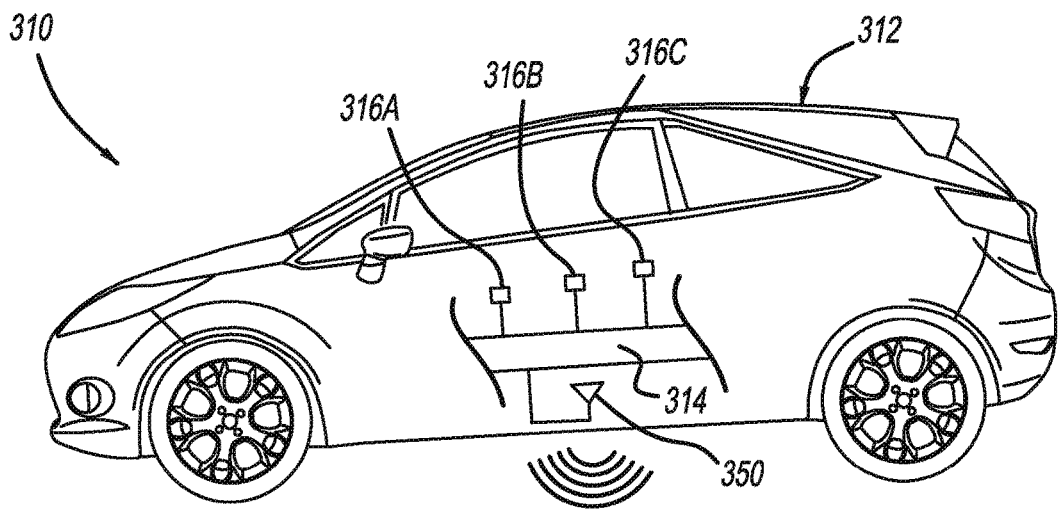
FIG. 6 illustrates the system for diagnosing and repairing vehicles of FIG. 3.
Figure 6:
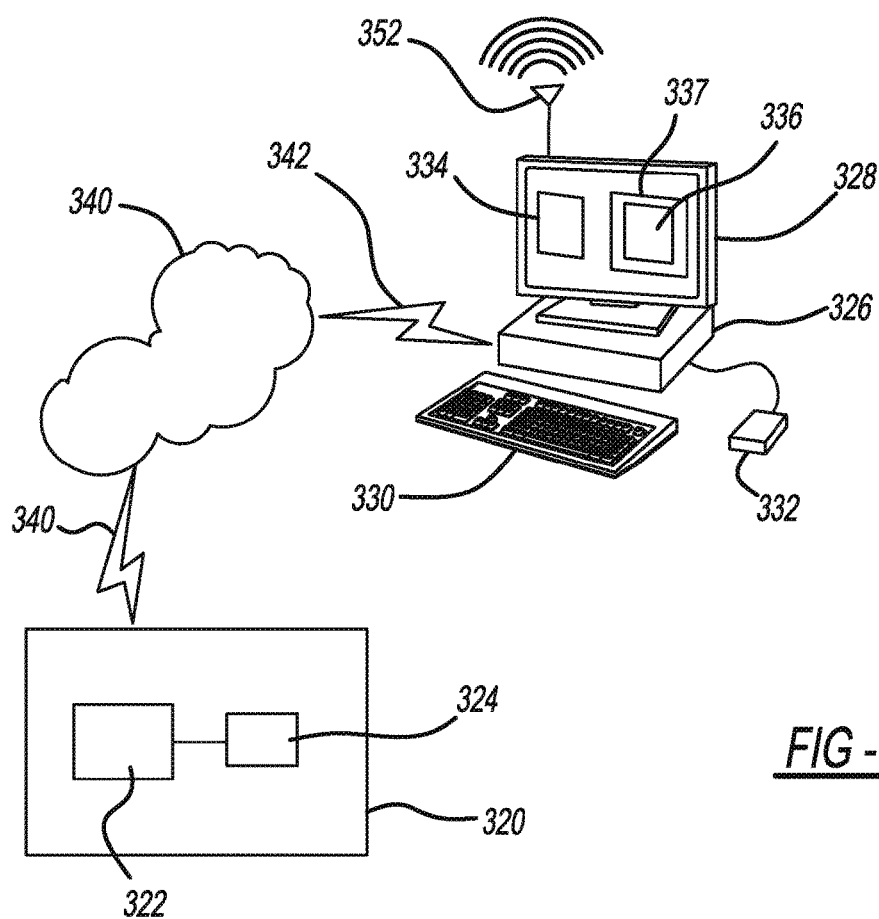

Referring to FIGS. 3 and 6, a flowchart and system of the system 310 is shown. FIG. 3 illustrates the flowchart, while FIG. 6 illustrates the system 310. Like reference numerals have been utilized to refer to like elements previously shown in FIGS. 2 and 5 and in the paragraphs above, with the difference that the reference numerals have increased by one hundred. As such, the description provided of these elements above is equally applicable to this embodiment and will not be repeated unless there is a difference.

The system 310 differs from the system 210 in that the vehicle 312 has a wireless interface 350 and the client 326 also has a wireless interface 352. By so doing, the client 326 can communicate with the vehicle 312 wirelessly. Any which one of a number of different wireless protocols may be utilized, such as those described in the paragraphs above. By so doing, the client 326 can communicate with the bus 314 of the vehicle 312 without the use of a physical connection.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. A diagnostic vehicle device for diagnosing and repairing a vehicle, the device comprising:
    at least one electronic controller configured to execute algorithms that generate data related to the diagnostic operations of the vehicle;
    an interface in communication with the at least one electronic controller of the diagnostic vehicle device;
    wherein the interface is configured to selectively communicate with at least one electronic controller of the vehicle;
    wherein the electronic controller of the diagnostic vehicle device is configured to provide access via an application programming interface to a user via the interface to data generated by the algorithms and restrict access to the algorithms that generate the data related to the diagnostic operations of the vehicle; and
    wherein the diagnostic vehicle device is separate from the vehicle.

2. The device of claim 1, further comprising:
    a client device operated by the user, the client device being configured to selectively communicate with the interface, wherein the client device receives the data related to the diagnostic operations of the vehicle; and
    a user application operating on the client device, wherein the user application is provided access via the application programming interface to data generated by the algorithms and restricted from access to the algorithms that generate the data related to the diagnostic operations of the vehicle.

3. The device of claim 2, wherein the interface is at least one of SAE J2534, IEEE 802.11x, USB, Ethernet, or a point to point connection.

4. The device of claim 2, wherein the diagnostic vehicle device is an internet-connected diagnostic device in which the user application has access to data generated by the algorithms and restricted from access to the algorithms that generate the data related to the diagnostic operations of the vehicle.

5. The device of claim 4, wherein the interface is at least one of SAE J2534, IEEE 802.11x, USB, Ethernet, or a point to point connection.

6. The device of claim 2, where the ability to initiate module reprogramming and view reprogramming results is delivered to the user application thru the diagnostic device.

7. The device of claim 2, where service information such as repair procedures, technical service bulletins, recall information, labor estimates, and other technical information is delivered to the user application thru the diagnostic device.

8. The device of claim 2, where VIN decoding information and specific vehicle configuration information such as tire size, engine displacement, transmission type, customer ordered options, regional configuration, and other build information is delivered to the user application thru the diagnostic device.

9. The device of claim 2, where a vehicle service history is delivered to the user application thru the diagnostic device.

10. The device of claim 2, where the vehicle manufacturing information and warranty status is delivered to the user application thru the diagnostic device.

11. The device of claim 2, where telematics data that is collected from the vehicle is delivered to the user application thru the diagnostic device.

12. The device of claim 2, where onboard flight recorder and crash data that is collected from the vehicle is delivered to the user application thru the diagnostic device.

13. The device of claim 2, where parts diagrams and part numbers relevant to the vehicle being serviced are delivered to the user application thru the diagnostic device.

14. The device of claim 2, where state and federal emissions tests can be performed thru the user application thru the diagnostic device.

15. The device of claim 2, where authorized images such as logos and trademarks are delivered to the user application thru the diagnostic device.

16. The device of claim 2, where access to the diagnostic device can be licensed to third party application developers to develop one or many different user applications.

17. The device of claim 2, where different user applications can be developed using information accessed thru the diagnostic device for vehicle diagnostics, vehicle reprogramming, vehicle manufacturing, OE vehicle engineering, OE vehicle calibration, vehicle quality control applications, state and federal inspection-maintenance applications, service writer applications, vehicle check-in for service applications, battery charger applications, air conditioning machine applications, wheel alignment applications, crash repair applications, tire pressure monitor applications, oil change applications, fluid flush applications, transmission service applications, and other vehicle related uses.

18. The device of claim 1, wherein the application programming interface is configured to allow for the starting, stopping, and pausing of diagnostic tests performed by the algorithms.

19. The device of claim 1, wherein the application programming interface is configured to allow for viewing live data, bi-directional controls, performing diagnostic tests, running health reports, configuring vehicle modules, and customizing vehicle module software.

\* \* \* \* \*